Nov. 28, 1933.  A. C. MOORK  1,936,800
RAKE
Filed April 1, 1932
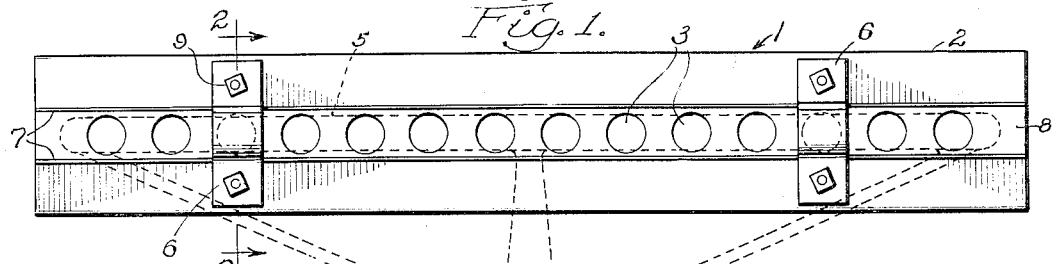
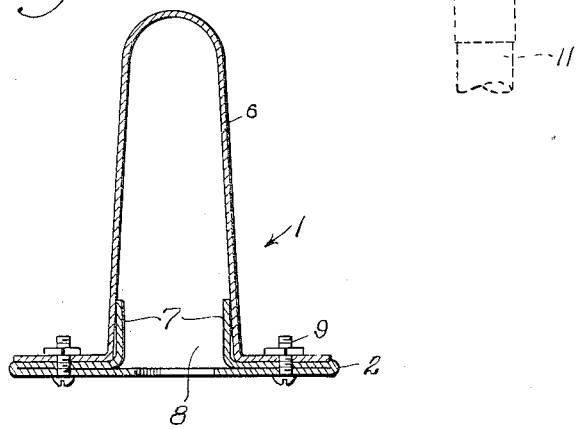
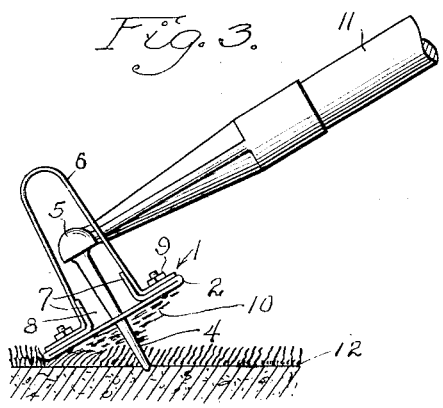
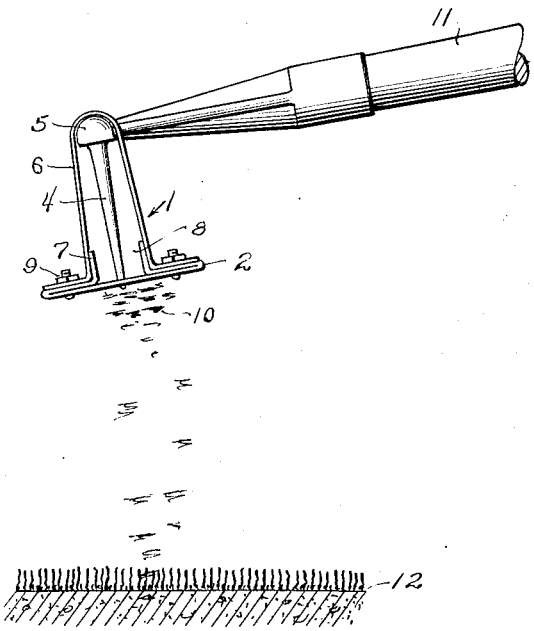
Inventor:
Alfred C. Moork.
By Rummler, Rummler & Woodworth.
Attys.
Witnesses:
Arthur M. Franke,
Fred M. Davis Patented Nov. 28, 1933

1,936,800

UNITED STATES PATENT OFFICE 1,936,800

RAKE

Alfred C. Moork, Chicago, Ill., assignor of one-half to David George Corbett, Chicago, Ill.

Application April 1, 1932. Serial No. 602,510

2 Claims. (Cl. 55—146)

This invention relates to automatic cleaning attachments for toothed implements, and more especially to such devices for cleaning hand rakes, which are commonly subject to clogging, as by leaves, etc., collecting on and sticking frictionally to the teeth.

The main objects of the invention are to provide simple means attachable to the work engaging end of a rake, for automatic removal of clogging material such as frequently collects on rake teeth; to provide such an attachment adapted to accommodate normal operation of the rake, and adapted for actuation by gravity to effect cleaning when the rake is raised, as in ordinary use; and to equip such a device with securing means having clearance accommodation for the rise and fall of the gravity cleaner member on the teeth when the rake is used.

This invention is illustrated by the accompanying drawing in which:

Figure 1 is a plan of the attachment in place, ready for use, the rake itself being shown only in dotted outline.

Fig. 2 is an enlarged cross section of the attachment on the line 2—2 of Fig. 1.

Fig. 3 is a side view of the rake and attachment as the rake is drawn over the lawn.

Fig. 4 is a side view similar to Fig. 3 but with the rake raised to discharge its load.

In the construction shown, the cleaner 1 comprises an oblong bar 2 having perforations 3 to freely receive the rake teeth 4 respectively when the cleaner is applied to the inner side of the cross bar 5 of the rake, said cleaner having inverted U-bars 6 secured to its upper side to extend over the cross bar 5 and accommodate up-and-down movement of the cleaner, lengthwise of the teeth when the rake is used in the usual way.

Said cleaner bar 2 is preferably wider than the usual rake cross bar so as to extend considerably over the material collected on the teeth and also add sufficient weight to the cleaner to render it gravitationally effective for clearing ordinary clogging.

The cleaner also preferably has a pair of upright flanges 7, which together with the longitudinally medial part of the cleaner form a channel 8 to receive the cross bar 5 of the rake, and also stiffen the cleaner itself.

When the cleaner 1 is to be used, the fastenings 9 for the U-holders are loosened sufficiently to permit application of the cleaner to the rake, whereupon the attachment being in place, the fastenings are tightened, thus securing the cleaner in freely movable relation lengthwise of the teeth 4 within the length limits of said teeth.

When the rake is being used, as for instance in raking leaves, the material 10 gathered on the teeth raises the cleaner 1 until it bears against the underside of the cross bar 5. The user then lifts the rake by raising the handle 11, whereupon the weight of the cleaner 1 causes the latter automatically to force the clogging material downward off the teeth onto the ground 12. The rake is then ready for further use. Before raising the rake, the load may be dragged on the ground to any desired dumping place, as for instance, a pile of leaves. If the material 10 sticks tenaciously the handle may be shaken somewhat to accentuate the effect of the cleaner 1, which being somewhat massive, acquires substantial momentum with a slight shake and so becomes assuredly effective under all ordinary circumstances.

It is to be understood that some of the details set forth may be altered or omitted without departing from the spirit of the invention as defined by the following claims.

I claim:

1. A hand rake cleaner comprising a sheet metal body to underlie the rake head, said body being apertured to accommodate lengthwise movement of the rake teeth and having its longitudinal edge flanges turned back on itself and thence upwardly in spaced relation to each other, in combination with spaced sheet metal U-bars disposed crosswise of said body and having outwardly turned feet fastened to the upper side of said flanges.

2. A hand rake having an automatic cleaner, said rake comprising a handle provided with a crossbar on the working end thereof and said bar having downwardly projecting teeth; said cleaner comprising an oblong sheet metal body apertured to receive said teeth, and said body having flanges formed thereon by bending its outer longitudinal edge portions upon itself and having their extreme outer edges bent upwardly adjacent to the medial upper portion of said body to reinforce said body, and said body having upwardly disposed sheet metal means of inverted U-shape to limit its downward movement, which U-shaped means are disposed against said flanges and are stiffened thereby, and means whereby said U-shaped members are fastened to said body, which body is movable lengthwise of said teeth, upwardly toward the cross-bar by operation of the rake as the load is collected and downwardly to discharge the load when the rake is raised.

ALFRED C. MOORK.